(12) United States Patent
Panasik et al.

(10) Patent No.: US 8,313,545 B2
(45) Date of Patent: Nov. 20, 2012

(54) AIR FILTER ASSEMBLY FOR COMBUSTION TOOL

(75) Inventors: Cheryl L. Panasik, Elburn, IL (US); Kevin M. Tucker, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 473 days.

(21) Appl. No.: 11/873,201

(22) Filed: Oct. 16, 2007

(65) Prior Publication Data

US 2009/0095249 A1  Apr. 16, 2009

(51) Int. Cl.
*B01D 46/00* (2006.01)

(52) U.S. Cl. ......... 55/385.1; 55/418; 55/495; 55/503; 55/504; 55/505; 55/524; 55/DIG. 24; 55/DIG. 42

(58) Field of Classification Search ......... 55/385.01, 55/385.1, 385.2, 385.3, 385.4, 419, 524, 55/DIG. 24, DIG. 14, DIG. 42, 418, 495, 55/503, 504, 505; 210/435, 440; 123/198 E, 123/41.86; 30/165–321; 227/10

See application file for complete search history.

(56) References Cited

U.S. PATENT DOCUMENTS

| | | | |
|---|---|---|---|
| 3,722,186 A * | 3/1973 | Parker et al. | 55/304 |
| 4,139,353 A * | 2/1979 | Garner | 96/341 |
| 4,261,302 A | 4/1981 | Sheldon | |
| 4,403,722 A | 9/1983 | Nikolich | |
| 4,438,733 A * | 3/1984 | Sasaki | 123/41.62 |
| 4,483,473 A | 11/1984 | Wagdy | |
| 4,483,474 A | 11/1984 | Nikolich | |
| 4,522,162 A | 6/1985 | Nikolich | |
| 4,602,595 A * | 7/1986 | Aoki et al. | 123/41.86 |
| RE32,452 E | 7/1987 | Nikolich | |
| 4,948,505 A | 8/1990 | Petrucci et al. | |
| 5,039,323 A * | 8/1991 | Ulitsky et al. | 55/320 |
| 5,121,715 A * | 6/1992 | Nogami et al. | 123/41.7 |
| 5,140,957 A * | 8/1992 | Walker | 123/198 E |
| 5,197,646 A | 3/1993 | Nikolich | |
| 5,199,626 A | 4/1993 | Terayama et al. | |
| 5,263,439 A | 11/1993 | Doherty et al. | |
| 5,329,913 A * | 7/1994 | Suzuki et al. | 123/573 |
| 5,438,965 A * | 8/1995 | Aronsson et al. | 123/198 E |
| 5,454,354 A * | 10/1995 | Miller | 123/196 A |
| 5,471,966 A * | 12/1995 | Feuling | 123/572 |
| 5,522,355 A * | 6/1996 | Uhl | 123/198 E |
| 5,582,146 A * | 12/1996 | Linsbauer et al. | 123/198 E |
| 5,846,271 A * | 12/1998 | Flynn et al. | 55/315 |
| 5,871,569 A * | 2/1999 | Oehler et al. | 96/153 |
| 6,145,724 A | 11/2000 | Shkolnikov et al. | |
| 6,309,436 B1 * | 10/2001 | Holch | 55/337 |
| 6,395,049 B2 * | 5/2002 | Knodler et al. | 55/385.3 |
| 6,626,984 B1 * | 9/2003 | Taylor | 96/380 |
| 6,638,330 B1 * | 10/2003 | Bergami | 55/315.1 |
| 6,761,748 B2 * | 7/2004 | Schenk et al. | 55/385.3 |

(Continued)

FOREIGN PATENT DOCUMENTS

GB  768167  2/1957

(Continued)

*Primary Examiner* — Duane Smith
*Assistant Examiner* — Thomas McKenzie
(74) *Attorney, Agent, or Firm* — Greer, Burns & Crain, Ltd.; Patty Chidiac; Mark W. Croll

(57) ABSTRACT

A filter element for a combustion tool includes a filter medium having pores with a pore size greater than a target particle size.

13 Claims, 4 Drawing Sheets

U.S. PATENT DOCUMENTS

| | | | |
|---|---|---|---|
| 6,881,238 B2* | 4/2005 | Marchart et al. | 55/495 |
| 6,883,321 B2* | 4/2005 | Fornof | 60/605.2 |
| 7,040,521 B2 | 5/2006 | Kolodziej et al. | |
| 7,143,920 B2 | 12/2006 | Panasik et al. | |
| 7,857,881 B2* | 12/2010 | Sato et al. | 55/385.3 |
| 8,025,707 B2* | 9/2011 | Furuya | 55/385.3 |
| 2003/0073370 A1* | 4/2003 | Strommen | 442/417 |
| 2003/0084788 A1* | 5/2003 | Fraser, Jr. | 95/285 |
| 2003/0126842 A1* | 7/2003 | Schenk et al. | 55/385.3 |
| 2004/0163372 A1* | 8/2004 | Nguyen | 55/497 |
| 2004/0231633 A1* | 11/2004 | Uhl et al. | 123/198 E |
| 2005/0211623 A1* | 9/2005 | Moscaritolo et al. | 210/440 |
| 2005/0241608 A1* | 11/2005 | Kobayashi et al. | 123/198 E |
| 2007/0012267 A1 | 1/2007 | Shkolnikov et al. | |
| 2007/0113815 A1* | 5/2007 | Kawarai et al. | 123/184.21 |

FOREIGN PATENT DOCUMENTS

GB    1388085    3/1975

* cited by examiner

AIR FILTER ASSEMBLY FOR COMBUSTION TOOL

BACKGROUND

The present invention relates to power tools, and more specifically to air filters used in combustion gas-powered tools.

In the construction industry, when power tools are used in the field, on construction sites and in remote areas, tools having a self-contained source of power are preferred. One example of a self-contained source of power is a combustion engine housed within a tool. Such tools are known as combustion-powered tools or combustion tools.

Combustion tools are known in the art, and are described in U.S. Pat. Re. No. 32,452, and U.S. Pat. Nos. 4,522,162; 4,483,473; 4,483,474; 4,403,722; 5,197,646; 5,263,439 and 6,145,724, all of which are incorporated by reference herein. Similar combustion-powered nail and staple driving tools are available commercially from Illinois Tool Works of Glenview, Ill.

Such tools incorporate a tool housing enclosing a small internal combustion engine. The engine is powered by a canister of pressurized fuel gas, also called a fuel cell. A battery-powered electronic power distribution unit produces a spark for ignition, and a fan located in a combustion chamber provides for both an efficient combustion within the chamber, while facilitating processes ancillary to the combustion operation of the device. Such ancillary processes include: inserting the fuel into the combustion chamber; mixing the fuel and air within the chamber; and removing, or scavenging, combustion by-products. The engine includes a reciprocating piston with an elongated, rigid driver blade disposed within a single cylinder body.

A valve sleeve is axially reciprocable about the cylinder and, through a linkage, moves to close the combustion chamber when a work contact element at the end of the linkage is pressed against a workpiece. This pressing action also triggers a fuel-metering valve to introduce a specified volume of fuel into the closed combustion chamber.

Upon the pulling of a trigger switch, which causes the spark to ignite a charge of gas in the combustion chamber of the engine, the combined piston and driver blade is forced downward to impact a positioned fastener and drive it into the workpiece. The piston then returns to its original or pre-firing position, through differential gas pressures within the cylinder. Fasteners are fed magazine-style into the nosepiece, where they are held in a properly positioned orientation for receiving the impact of the driver blade.

Oftentimes, combustion tools are used in areas of dense contaminating particulates such as concrete dust, gypsum dust and the like. An unfortunate side effect of working in such environments is that unwanted contaminating particles regularly gum up and jam the moving parts of the tool and make it inoperable relatively early in its life cycle. Typical tools using combustion power are nail guns, concrete pin guns, screw guns, and the like.

Foam filters have previously been implemented in an effort to reduce the amount of unwanted particles gumming up and jamming moving parts within a tool. Although foam filters provide ample airflow, they are often too thin and do not allow for sufficient directional changes of airflow. Consequently, deflection opportunities for contaminating particulates are often insufficient. Moreover, the pores in these filters are too large and often do not trap tiny particulates of ten microns or less. Filters having smaller pores that trap ten-micron particulate have also been used. These filters, however, clog quickly, restrict airflow, and inhibit combustion tool operation.

Other prior art filters used in combustion tools include sponge filters and pleated filters. Sponge filters allow contamination to pass into the internal parts of the engine and cause premature failure. Pleated filters are relatively expensive compared to foam and sponge filters and also require frequent replacement.

BRIEF SUMMARY OF THE INVENTION

The present filter assembly addresses the above-identified drawbacks of conventional combustion tool air filters and features a foam filter that has pores larger than the target particle size, and is preferably saturated with oil. It has been found that the larger pore size allows ample airflow, decrease instances of clogging, increases particle path distance, the number of directional changes, and the number of deflection opportunities within the filter element and the filter housing assembly. Additionally, the oil that saturates the foam filter traps ten-micron particulates. Such an assembly has proved to increase tool life by at least three times, provide high filtration without air flow degradation, and reduce the cost of filter material. Tools having the present filter assembly are cleaner, thereby decreasing friction and allowing the engine to run cooler. The internal moving parts in the o-ring areas also stay clean and do not bind, thus eliminating the user hitting the tool hard against the substrate to force actuation among dirty binding parts. Furthermore, oil vapor from the oil saturated filter can travel from the filter into the cylinder and piston assembly of the tool thus reducing friction, o-ring wear, and the drying out of O-rings.

More specifically, the present filter element for a combustion tool has a filter medium with pores having a pore size greater than a target particle size.

In another embodiment, a filter assembly for a combustion tool includes a housing defining a filter chamber. The housing has a closed end and an opposite open end. At least one air stack is associated with the open end, has a base and defines at least one conduit with an inlet end in fluid communication with the filter chamber so that filtered air may flow freely from the chamber into the inlet end. At least one filter element is located in the housing between the base and the conduit inlet end. The housing has at least one intake slit configured such that air entering through the slit is forced to pass through at least one filter element before entering into the inlet end of the conduit.

In still another embodiment, a combustion tool has a housing that encloses a combustion power source and has an upper housing end. A filter housing is disposed upon the upper housing end, the filter housing defines a filter chamber and has a closed end; and an opposite open end. At least one air stack is located at least partially within the filter housing and has a base and a conduit. The conduit has an inlet end in fluid communication with the chamber. In addition, the base end of the conduit is in fluid communication with the power source.

At least one filter element is located in the filter housing between the base of the at least one air stack and the conduit inlet end. At least one intake slit in the housing is configured such that air entering the housing through the slit is forced to pass through the filter element before entering the conduit inlet end. At least one filter medium is a foam material saturated with oil, and has pores with a pore size greater than a target particle size.

DETAILED DESCRIPTION OF THE INVENTION

Figure 1:
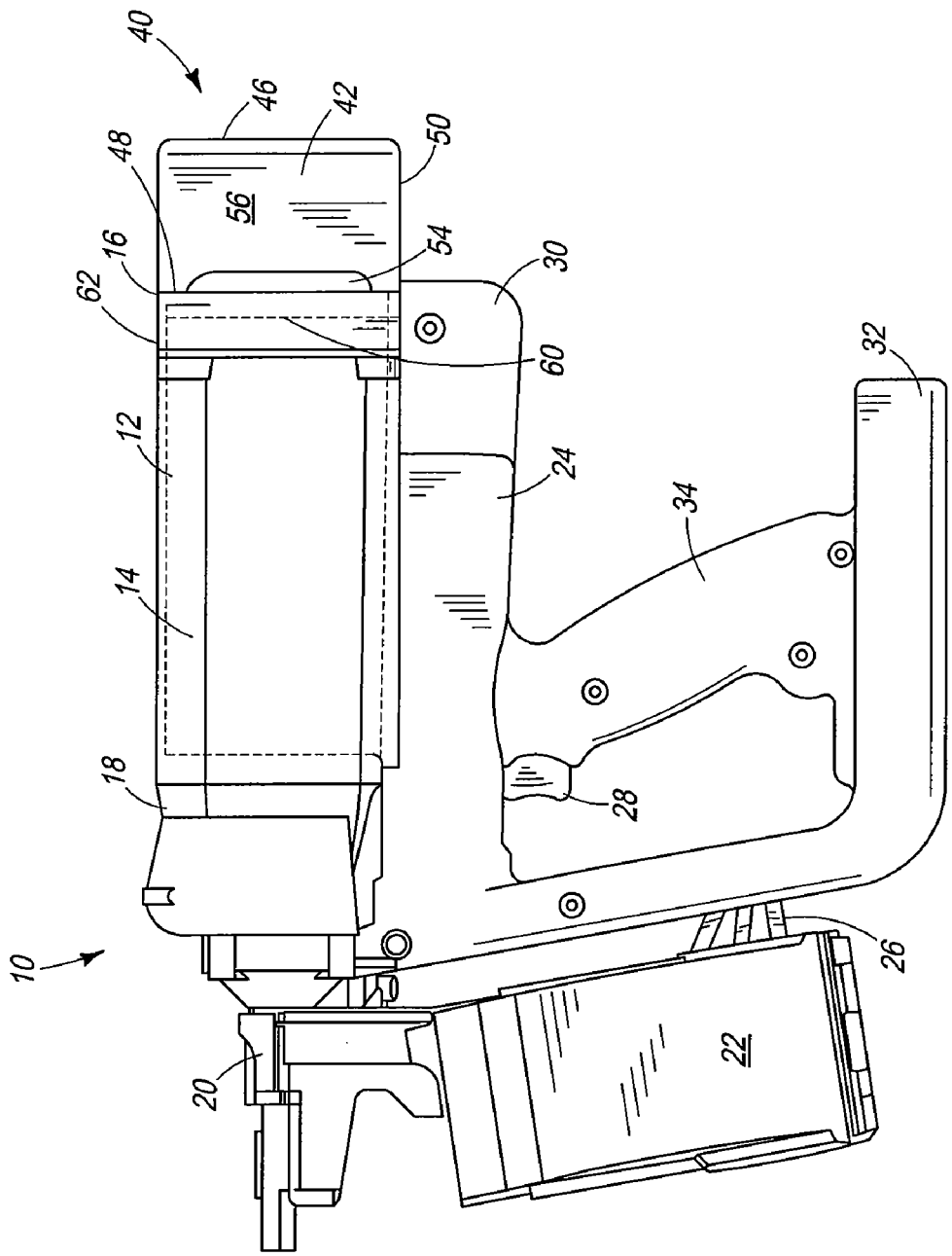
FIG. 1 is a side elevation of a combustion tool equipped with the present filter assembly.

Referring now to FIG. 1, a combustion tool suitable for use with the present filter assembly is generally designated 10. It will be appreciated that the specific type and configuration of combustion tool may vary to suit the application. Included in the tool 10 is a tool housing 12 enclosing a combustion power source 14 (shown hidden) and having an upper housing or air intake end 16 and an opposite fastener driving end 18. Projecting from the fastener driving end. 18 is a tool nosepiece 20. Fasteners are fed from a magazine 22 into the nosepiece 20, where they are impacted by a driver blade (not shown) reciprocating within the power source 14 as well known in the art. The magazine 22 is shown as a coil type, however straight magazines using strips of fasteners are also contemplated.

A handle portion 24 of the housing 12 supports the magazine 22 by providing an attachment point 26. Also found on the handle portion 24 is a trigger 28 for initiating the combustion that drives the fasteners. A fuel cell chamber 30 is defined for receiving fuel cells, as well known in the art. A battery chamber 32 is located at an opposite end of a grip 34 from the fuel cell chamber 30.

Figure 2:
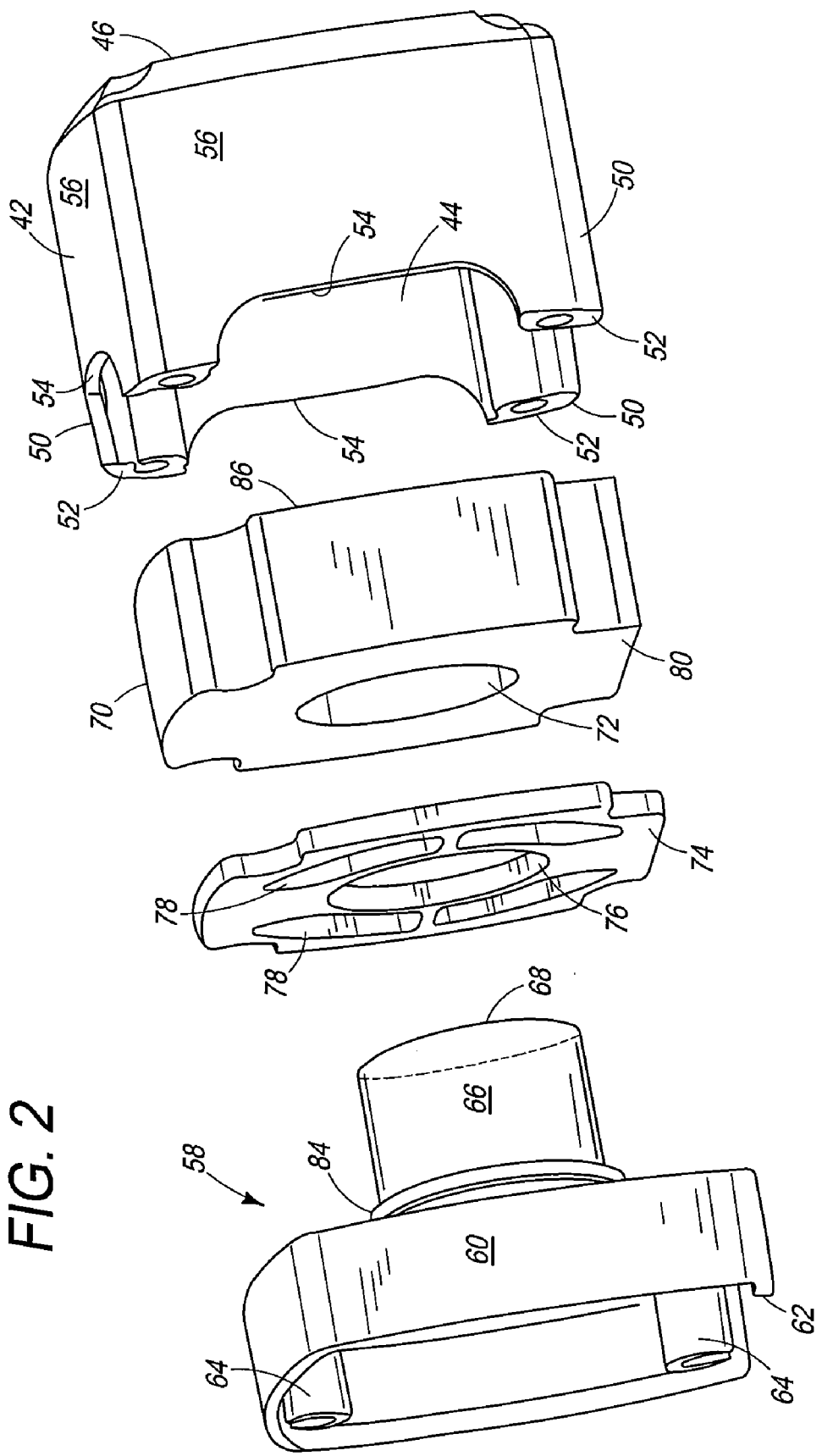
FIG. 2 is an exploded perspective view of the present filter assembly.
Figure 3:
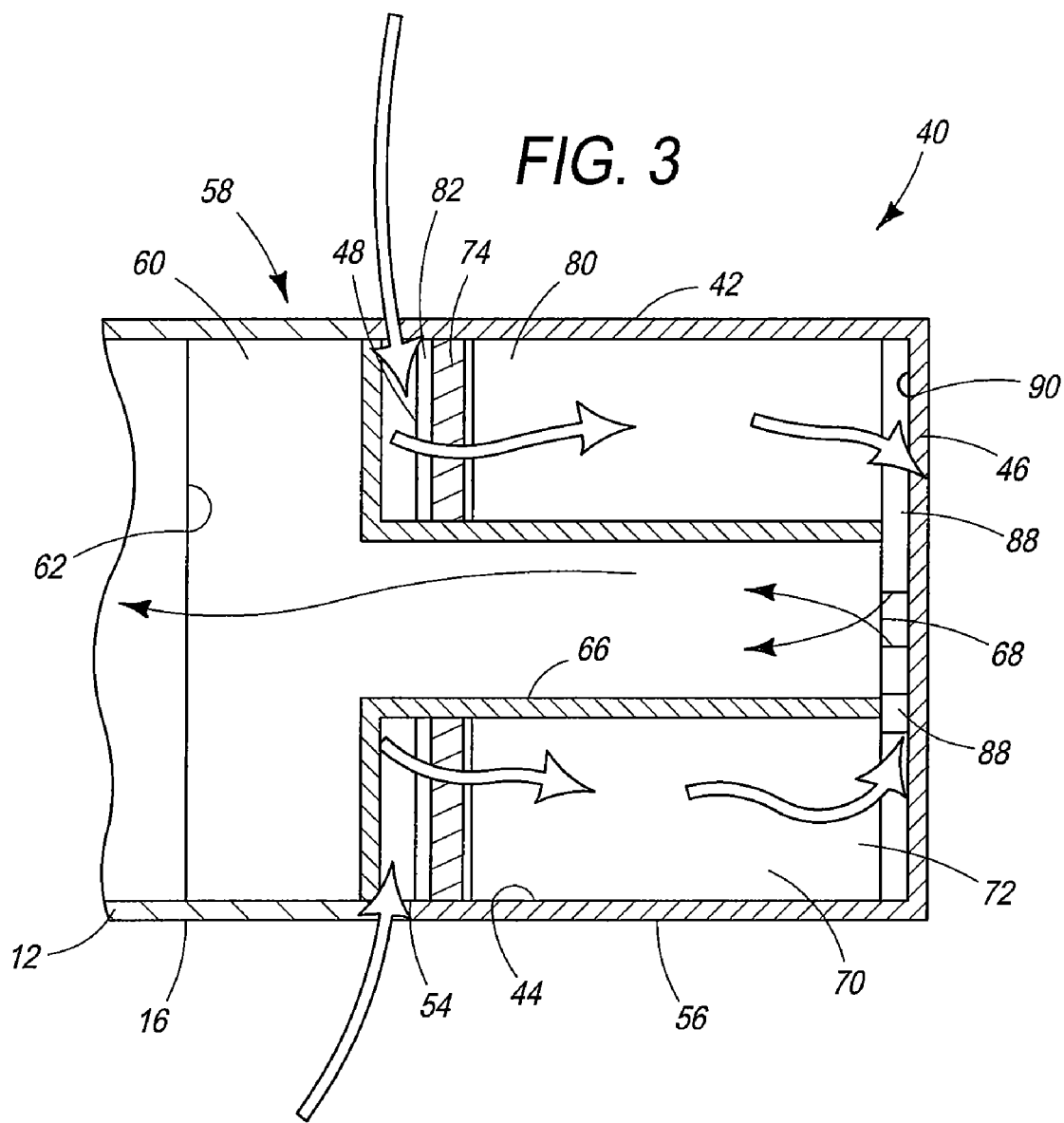
FIG. 3 is a vertical cross-section of the present filter assembly.

Referring now to FIGS. 1-3, the present filter assembly is generally designated 40, and includes a filter housing 42 defining a filter chamber 44 and having a closed end 46 and an open end 48. At each corner 50 of the housing 42, an attachment boss 52 is configured for receiving a fastener (not shown) for attaching the housing to the upper end 16 of the tool housing 12 as will be described below. An intake slit 54 is preferably located at the open end 48 of each wall 56 of the filter housing 42 for allowing ambient air to enter the housing and ultimately, the tool 10.

At least one air stack 58 is disposed in the open end 48 and has a base 60 with a base end 62 directly attachable to the upper housing end 16 through corner bosses 64 in registry with the attachment bosses 52 and configured for receiving a fastener passing through both the filter housing 42, the base 60 and ultimately the housing 12. Also on the air stack 58 is defined at least one conduit 66 with an inlet end 68 opposite the base end 62. The inlet end 68 is in fluid communication with the filter chamber 44 as well as with the power source 14 by virtue of the hollow base 60. In the preferred embodiment, the conduit inlet end 68 is sufficiently displaced from base 60 such that air entering the inlet end is relatively cooler than ambient air surrounding the power source 14.

At least one filter element 70 is located in the filter housing 42 between the base 60 and the conduit inlet end 68. While a variety of filter media are contemplated, it is preferred that the filter element 70 is made of foam having a pore size which is larger than the target contaminant particle size. A variety of foam materials are contemplated, however the preferred foam is 60 pores per inch polyester.

A feature of the present filter assembly 40 is that in conjunction with the larger pore size, the filter element 70 is saturated with oil to trap contaminating particles, the pores are arranged in a misaligned configuration to force directional changes in airflow and increase contact between particles of contamination and the oil. While a variety of oils are contemplated, it is preferred that the oil is clean four-cycle engine oil. Each pathway bend or change in airflow direction increases the probability of the particles contacting a spot of oil present on the filter element 70 and becoming trapped in the filter. The large pore size is designed to allow ample air flow, and the filter element 70 has sufficient thickness to increase particle path distance and numerous deflection opportunities within the filter element. This configuration has proved to increase tool life by three times or more.

Also, the element 70 is provided with a sufficient thickness measured between the base 60 and the closed end 46 so that the inflowing ambient air has sufficient opportunity to change direction and come in contact with the oil to remove significant proportion of the target particles. While other dimensions are contemplated, it is preferred that the filter element 70 be at least ⅜ inch thick. Also, while a unitary element 70 is preferred, it is also contemplated that the element be provided in separate pieces. Another advantage of the present filter element 70 when assembled in the filter housing 42 is that operational noises generated by the power source 14 are muffled or reduced when compared to a similar tool using a conventional thin filter alone.

The filter element 70 is dimensioned to slidingly yet snugly engage the attachment bosses 52 and the walls 56, and is provided with a central bore 72 for accommodating the conduit 66. In addition, the filter element 70 is retained in the filter housing 42 from axial movement by a diffuser and support 74 which includes a central aperture 76 as well as at least one and preferably a plurality of diffuser apertures 78. At a tool end 80 of the filter element 70, a radially internally projecting rib 82 (FIG. 3) retains the diffuser and support 74 in place relative to the housing 42. An optional radially projecting lip 84 (FIG. 2) is provided on the conduit 66 to prevent the diffuser and support 74 from blocking the intake slits 54. It is contemplated that both the rib 82 and the lip 84 may alternately be annular or segmented.

Opposite the tool end 80, a housing end 86 is held in place by at least one standoff 88 (FIG. 3.) preferably integrally molded to the housing 42. Preferably a plurality of standoffs 88 are spaced about an inner surface 90 of the closed end 46 to create spaces for air to flow from the housing end 84 of the filter element 70 and into the inlet end 68. The standoffs 88 also impact the inlet end 68 of the conduit 66 for structural support. More specifically, the standoffs 88 define a space for air to flow and pass through the filter element 70, contact the inner surface 90 of the closed end 46, and change direction to flow into the conduit inlet end 68. From the inlet end 68; the filtered air then flows into the power source 14.

Upon assembly, the filter housing 42 encloses the filter element 70, the diffuser and support 74 and the conduit 66. It will be seen that the intake slits 54 are defined in part by the base 60 as well as the open end 48.

Figure 4:
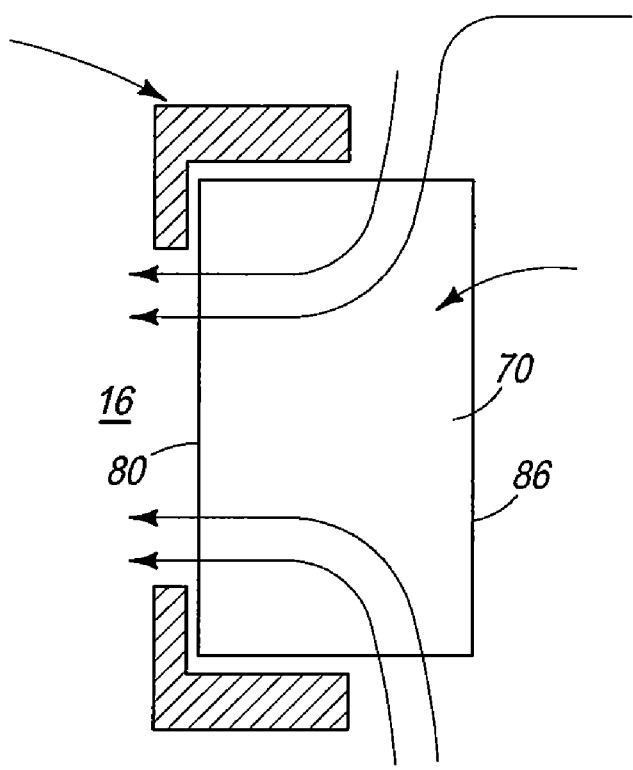
FIG. 4 is a schematic cross-section of an alternate embodiment of the present filter assembly.
Figure 5:
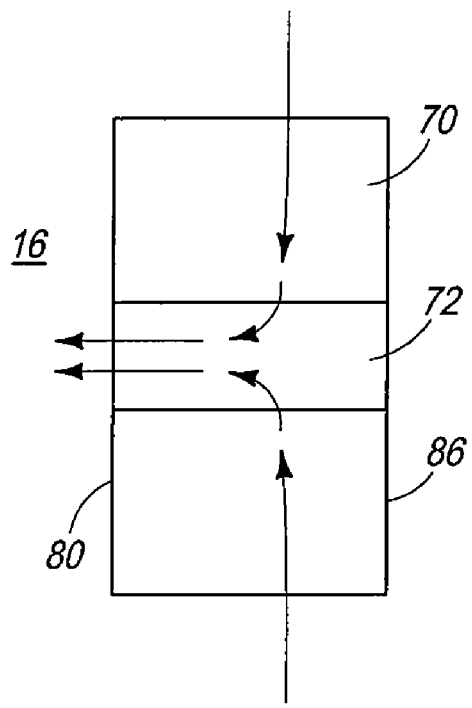
FIG. 5 is a schematic cross-section of another alternate embodiment of the present filter assembly.
Figure 6:
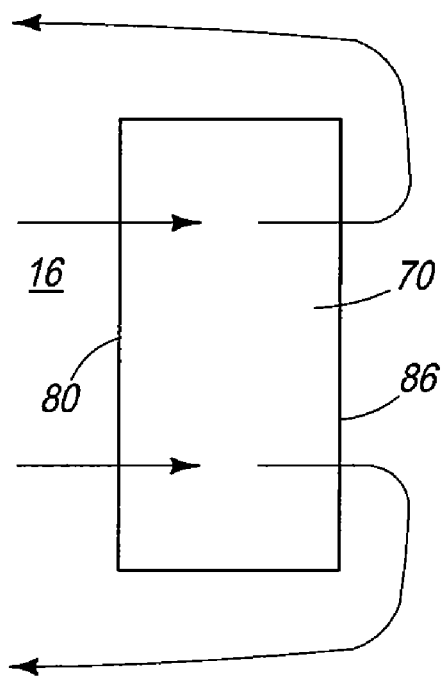
FIG. 6 is a schematic cross-section of still another alternate embodiment of the present filter assembly.

Referring now to FIGS. 4-6, it is contemplated that other filter housings may be provided which create different air flows through the filter element 70. As long as the air is forced to change directions within the filter element, and be exposed to the oil for trapping the target particles, any of these flow patterns are considered satisfactory. In FIG. 4 the inflowing air enters the filter element laterally, then makes an approximate 90° bend before entering the power source 14 from an end of the element itself.

Referring now to FIG. 5, the airflow enters laterally as in FIG. 4, but once filtered then enters the axial passageway 72 which causes the change in directional flow and through which the filtered air flows into the power source 14. In FIG.

6, the ambient air enters the filter element 70 from the tool end 80, passes through the filter, then changes direction radially externally of the element for transmittal back to the power source 14.

It will be seen that in addition to longer tool operational life due to a reduction in airborne contaminants, the present filter assembly 40 provides a low cost filter element material having a relatively long operational life without replacement. A relatively high filtration percentage is achieved without impeding air flow into the tool. The present filter assembly 40 also has been found to reduce operational tool temperature since the air is drawn into the tool farther from the combustion power source and as such is cooler. It has also been found that internal engine lubrication is improved due to oil vapor from elevated power source temperatures in operational proximity to the oil saturated filter element travels with the filtered air into the cylinder and piston assembly of the power source, thus reducing friction and o-ring wear and o-ring dry out.

While a particular embodiment of the present filter assembly for a combustion tool has been described herein, it will be appreciated by those skilled in the art that changes and modifications may be made thereto without departing from the invention in its broader aspects and as set forth in the following claims.

What is claimed is:

1. A filter assembly for a combustion tool comprising:
    a housing defining a filter chamber and having a closed end and an opposite open end;
    at least one air stack disposed in said open end and having a base with a base end and defining at least one conduit with an inlet end opposite said base end, said inlet end being in fluid communication with said filter chamber;
    said at least one conduit is in fluid communication with the tool so that filtered air may flow freely from said at least one air stack into the tool;
    at least one filter element located in said housing between said base and said inlet end, said at least one filter element including a top surface and a bottom surface;
    said housing having at least one air intake slit positioned adjacent to said at least one filter element and configured such that air entering said slit is forced to pass through said at least one filter element before entering said inlet end; and
    at least one standoff wall enclosed by said housing and extending between said bottom surface of said at least one filter element and said closed end of said housing, said at least one standoff wall defining a space extending from said bottom surface of said at least one filter element to said inlet end for air to flow substantially through said at least one filter element, contact an inner surface of said closed end, and change direction to flow through said inlet end and into said at least one conduit.

2. The filter assembly of claim 1, further including at least one filter diffuser and support in operational relationship to said housing for retaining said at least one filter element in position.

3. The filter assembly of claim 2, wherein said filter housing encloses said filter element, said diffuser and support and said conduit.

4. The filter assembly of claim 2, further including a retaining structure associated with said filter housing for securing said diffuser and support.

5. The filter assembly of claim 1, wherein said base of said at least one air stack is configured for attachment to the combustion tool.

6. The filter assembly of claim 1, wherein said at least one intake slit is defined by said open end and said base of said at least one air stack so that outside air can flow into said chamber.

7. The filter assembly of claim 1, wherein said at least one filter element has at least one filter medium having pores with a pore size greater than a target particle size.

8. The filter assembly of claim 7, wherein said at least one filter medium is a foam material saturated with oil to trap contaminating particles, said pores are arranged in a misaligned configuration to force directional changes in airflow and increase contact between particles of contamination and said oil.

9. The filter assembly of claim 1, wherein the combustion tool has a combustion power source, said base is configured for attachment to a housing of said tool, and said conduit inlet end is sufficiently displaced from said base such that air entering said inlet end is relatively cooler than ambient air surrounding the power source.

10. The filter assembly of claim 1, wherein the combustion tool has a combustion power source, and wherein said filter element is provided in a sufficient thickness and when installed in said filter housing reduces operational noise generated by the power source compared to a similar tool equipped with a standard filter.

11. A combustion tool comprising:
    a tool housing enclosing a combustion power source and having an upper housing end;
    a filter housing disposed upon said upper housing end, said filter housing defining a filter chamber and having a closed end and an opposite open end;
    at least one air stack at least partially located within said filter housing and having a base and a conduit, said conduit having a base end and an inlet end, in fluid communication with said chamber, said base end of said conduit is in fluid communication with said power source;
    at least one filter element having opposing ends and being located in said filter housing between said base and said inlet end, said housing having at least one air intake slit positioned adjacent to said at least one filter element and configured such that air entering said slit is forced to pass through said at least one filter element before entering said inlet end;
    said at least one filter element being a foam material saturated with oil, and having pores with a pore size greater than a target particle size, said pores each having a length and arranged in a misaligned configuration along said length to force directional changes in airflow and increase contact with said at least one filter element; and
    at least one standoff wall enclosed by said tool housing and extending from a point adjacent to one of said ends of said filter element and said closed end of said housing, said at least one standoff wall defining a space extending from said at least one filter element to said inlet end for air to flow through said at least one filter element, contact an inner surface of said closed end, and change direction to flow through said inlet end and into said conduit.

12. The filter assembly of claim 1, wherein said at least one conduit includes a non-perforated wall.

13. The filter assembly of claim 11, wherein said at least one conduit includes a non-perforated wall.

* * * * *